(12) United States Patent
Mackey et al.

(10) Patent No.: US 11,356,851 B2
(45) Date of Patent: Jun. 7, 2022

(54) COMMUNICATIONS SYSTEM HAVING MULTIPLE CARRIERS WITH SELECTIVELY TRANSMITTED REAL INFORMATION AND FAKE INFORMATION AND ASSOCIATED METHODS

(71) Applicant: HARRIS GLOBAL COMMUNICATIONS, INC., Albany, NY (US)

(72) Inventors: Christopher D. Mackey, Spencerport, NY (US); Richard J. Buckley, Chandler, AZ (US); Myung K. Lee, Penfield, NY (US); James A. Norris, Fairport, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 261 days.

(21) Appl. No.: 16/701,212

(22) Filed: Dec. 3, 2019

(65) Prior Publication Data
US 2021/0168616 A1 Jun. 3, 2021

(51) Int. Cl.
| H04L 9/00 | (2022.01) |
| H04W 12/122 | (2021.01) |
| H04L 5/02 | (2006.01) |
| H04L 5/06 | (2006.01) |
| H04L 27/00 | (2006.01) |

(52) U.S. Cl.
CPC ........... *H04W 12/122* (2021.01); *H04L 5/023* (2013.01); *H04L 5/06* (2013.01); *H04L 27/0008* (2013.01)

(58) Field of Classification Search
CPC ........ H04W 12/122; H04L 5/023; H04L 5/06; H04L 27/0008
USPC ......................................................... 726/26
See application file for complete search history.

(56) References Cited

U.S. PATENT DOCUMENTS

| 7,801,106 | B2 | 9/2010 | Uskela et al. |
| 8,711,688 | B1 | 4/2014 | Smith et al. |
| 9,185,516 | B2 | 11/2015 | Fischer et al. |
| RE47,533 | E | 7/2019 | Bartlett |
| 10,361,972 | B2 | 7/2019 | Biruduraju |
| 10,362,018 | B2 | 7/2019 | Helms et al. |
| 10,362,019 | B2 | 7/2019 | Canavor et al. |
| 10,362,031 | B2 | 7/2019 | Dawoud et al. |
| 10,362,056 | B1 | 7/2019 | El Hariri et al. |
| 10,362,057 | B1 | 7/2019 | Wu |
| 10,362,172 | B2 | 7/2019 | Strong et al. |
| 10,365,376 | B2 | 7/2019 | Lee et al. |
| 10,365,716 | B2 | 7/2019 | Aimone et al. |

(Continued)

FOREIGN PATENT DOCUMENTS

EP 2938039 10/2015

*Primary Examiner* — Josnel Jeudy
(74) *Attorney, Agent, or Firm* — Allen, Dyer, Doppelt + Gilchrist, P.A.

(57) ABSTRACT

A radio frequency (RF) communications system may include an RF transmitter having multicarrier transmitter circuitry that transmits frequency bands over a frequency range. A controller may selectively transmit real information over at least one of the frequency bands and selectively transmits fake information within the frequency range. The controller's operation is based on embedded machine learning model and real-time effectiveness feedback from built-in spectral analyzer. An RF receiver receives the real information from the RF transmitter.

21 Claims, 8 Drawing Sheets

(56) References Cited

U.S. PATENT DOCUMENTS

| | | |
|---|---|---|
| 10,365,748 B2 | 7/2019 | Pillarisetty |
| 10,365,810 B2 | 7/2019 | Sundermeyer et al. |
| 10,366,090 B2 | 7/2019 | Shorman et al. |
| 10,366,158 B2 | 7/2019 | Bellegarda et al. |
| 10,366,171 B1 | 7/2019 | Zhang et al. |
| 10,366,253 B2 | 7/2019 | Plusquellic |
| 10,366,325 B2 | 7/2019 | Burchard |
| 10,366,502 B1 | 7/2019 | Li |
| 10,366,594 B2 | 7/2019 | Dixon et al. |
| 10,367,096 B2 | 7/2019 | Yamazaki et al. |
| 10,367,524 B2 | 7/2019 | Tucker et al. |
| 10,367,578 B2 | 7/2019 | Xu et al. |
| 10,367,603 B2 | 7/2019 | Henry et al. |
| 10,367,620 B2 | 7/2019 | Iyer et al. |
| 10,367,656 B2 | 7/2019 | Francisco et al. |
| 10,367,712 B2 | 7/2019 | Singh |
| 10,367,746 B2 | 7/2019 | Xu et al. |
| 10,367,767 B2 | 7/2019 | Jayaram et al. |
| 10,367,811 B2 | 7/2019 | Clark et al. |
| 10,367,834 B2 | 7/2019 | Sweet et al. |
| 10,367,846 B2 | 7/2019 | Gorodissky et al. |
| 10,367,848 B2 | 7/2019 | Ito |
| 10,367,885 B1 | 7/2019 | Cox |
| 10,368,034 B2 | 7/2019 | Zuo et al. |
| 10,368,072 B2 | 7/2019 | Zhang et al. |
| 10,368,096 B2 | 7/2019 | Braness et al. |
| 10,368,131 B2 | 7/2019 | Kim |
| 10,368,185 B2 | 7/2019 | Arunkumar et al. |
| 10,368,193 B2 | 7/2019 | Reitz et al. |
| 10,368,199 B2 | 7/2019 | Van Os et al. |
| 10,368,239 B2 | 7/2019 | Jover |
| 10,368,250 B2 | 7/2019 | Barzegar et al. |
| 10,368,315 B2 | 7/2019 | Niewczas |
| 2004/0008617 A1* | 1/2004 | Dabak .................... H04J 13/004 370/208 |
| 2015/0146765 A1* | 5/2015 | Moffatt .................. H04B 1/525 375/219 |
| 2015/0280673 A1* | 10/2015 | Tasic .................. H04B 1/0003 455/234.1 |
| 2015/0293234 A1 | 10/2015 | Snyder et al. |
| 2017/0214486 A1 | 7/2017 | Choi et al. |
| 2017/0332280 A1* | 11/2017 | Kuroda ................. H04W 28/16 |
| 2019/0094711 A1* | 3/2019 | Atkins ................. G01N 21/211 |
| 2019/0097858 A1* | 3/2019 | Stuart ................. H04L 5/0048 |
| 2019/0179861 A1* | 6/2019 | Goldenstein ........... G06F 16/367 |
| 2019/0215215 A1* | 7/2019 | Maltsev ............ H04W 56/0015 |
| 2021/0120426 A1* | 4/2021 | Li ....................... H04B 17/309 |
| 2021/0168616 A1* | 6/2021 | Mackey .............. H04L 27/0008 |

\* cited by examiner

COMMUNICATIONS SYSTEM HAVING MULTIPLE CARRIERS WITH SELECTIVELY TRANSMITTED REAL INFORMATION AND FAKE INFORMATION AND ASSOCIATED METHODS

FIELD OF THE INVENTION

The present invention relates to the field of communications systems, and, more particularly, to multicarrier communications systems and related methods.

BACKGROUND OF THE INVENTION

Multicarrier modulation is a communications technique that transmits data by transmitting the data over multiple carriers that are normally closely spaced to each other. Multicarrier modulation has several advantages, including resilience to multipath, narrowband fading, and interfering signals and increased data throughput. Examples of multicarrier modulation techniques include Orthogonal Frequency Division Multiplexing (OFDM) modulation and Filter Bank Multicarrier (FBMC) modulation, which modifies OFDM by filtering the side lobes of the OFDM communications signal.

In addition to these multicarrier modulation techniques, such as OFDM and FBMC, are the wideband spread spectrum techniques used in cellular communications, for example, Code Division Multiple Access (CDMA), multiple access communications, where several transmitters send information simultaneously over a single communications channel by spreading the data using a specific code assigned to each transmitter.

Even with sophisticated improvements in multicarrier modulation techniques and sophisticated improvements in wideband spread spectrum techniques, such as CDMA, adversaries and rogue individuals that purposefully want to interfere with these communications systems are growing in number. Their interfering techniques vary, but may include purposefully jamming a communications signal to interfere with those communications. There are different ways to counter this interference, including highly effective low probability of interference (LPI), low probability of detection (LPD), and anti-jamming (AJ) mitigation techniques. All these mitigation techniques, however, have a half-life and adversaries or rogue individuals often determine which LPI, LPD, and AJ counter measures are being used, and thus, gain access to or interfere with the legitimate communications. Further development to convince an adversary or rogue individual that they may be successfully impeding a communications link, but in reality are not, would be helpful.

SUMMARY OF THE INVENTION

In general, a radio frequency (RF) communications system may include an RF transmitter that may comprise multicarrier transmitter circuitry configured to transmit in a plurality of frequency bands over a frequency range. A controller may be configured to selectively transmit real information over at least one of the plurality of frequency bands, and to selectively transmit fake information within the frequency range. An RF receiver may be configured to receive the real information from the RF transmitter.

The controller may be configured to selectively transmit the fake information over at least one other of the plurality of frequency bands. A spectral analyzer may be operable over the frequency range and the controller may be configured to determine which at least one other of the plurality of frequency bands to transmit the fake information based upon the spectral analyzer. The controller may be configured to operate the multicarrier transmitter circuitry to increase detectability of the fake information.

The multicarrier transmitter circuitry may comprise a plurality of modulators, a plurality of spreading stages coupled downstream from the plurality of modulators, and a plurality of filters coupled downstream from the plurality of spreading stages. The real information may be spread within the plurality of spreading stages and the fake information may not be spread. A spectral analyzer may be operable over the frequency range and the controller may be configured to cooperate with the multicarrier transmitter circuitry to implement a trained model based upon the spectral analyzer. The controller may be configured to transmit the fake information at a different time than the real information. The controller may be configured to transmit the fake information at a higher power level than the real information.

In yet another example, a radio frequency (RF) transmitter may comprise multicarrier transmitter circuitry configured to transmit in a plurality of frequency bands over a frequency range. A controller may be configured to selectively transmit real information over at least one of the plurality of frequency bands, and to selectively transmit fake information within the frequency range.

Another aspect is directed to a method of operating a radio frequency (RF) transmitter that may comprise transmitting multicarrier transmitter circuitry in a plurality of frequency bands over a frequency range. The method includes operating a controller to selectively transmit real information over at least one of the plurality of frequency bands, and to selectively transmit fake information within the frequency range.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

The system is operative to convince an adversarial receiver to track, intercept, or attack a fake communication activity while the system itself conducts an intended communication activity. The system may use a multicarrier spread spectrum communication, as an example, but its applicability is not limited to multicarrier spread spectrum communication systems. The system may also be applied to single carrier and or non-spread spectrum communication systems.

Figure 1:
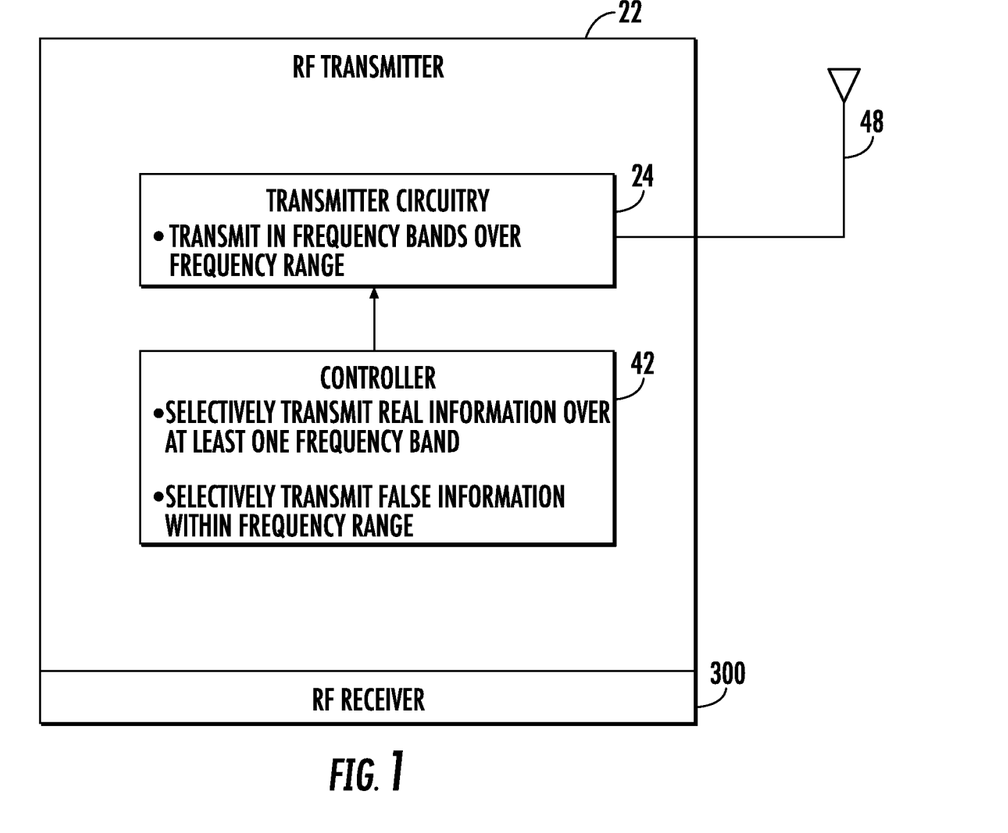
FIG. 1 is a block diagram of the radio frequency (RF) communications system according to the invention.
Figure 2:
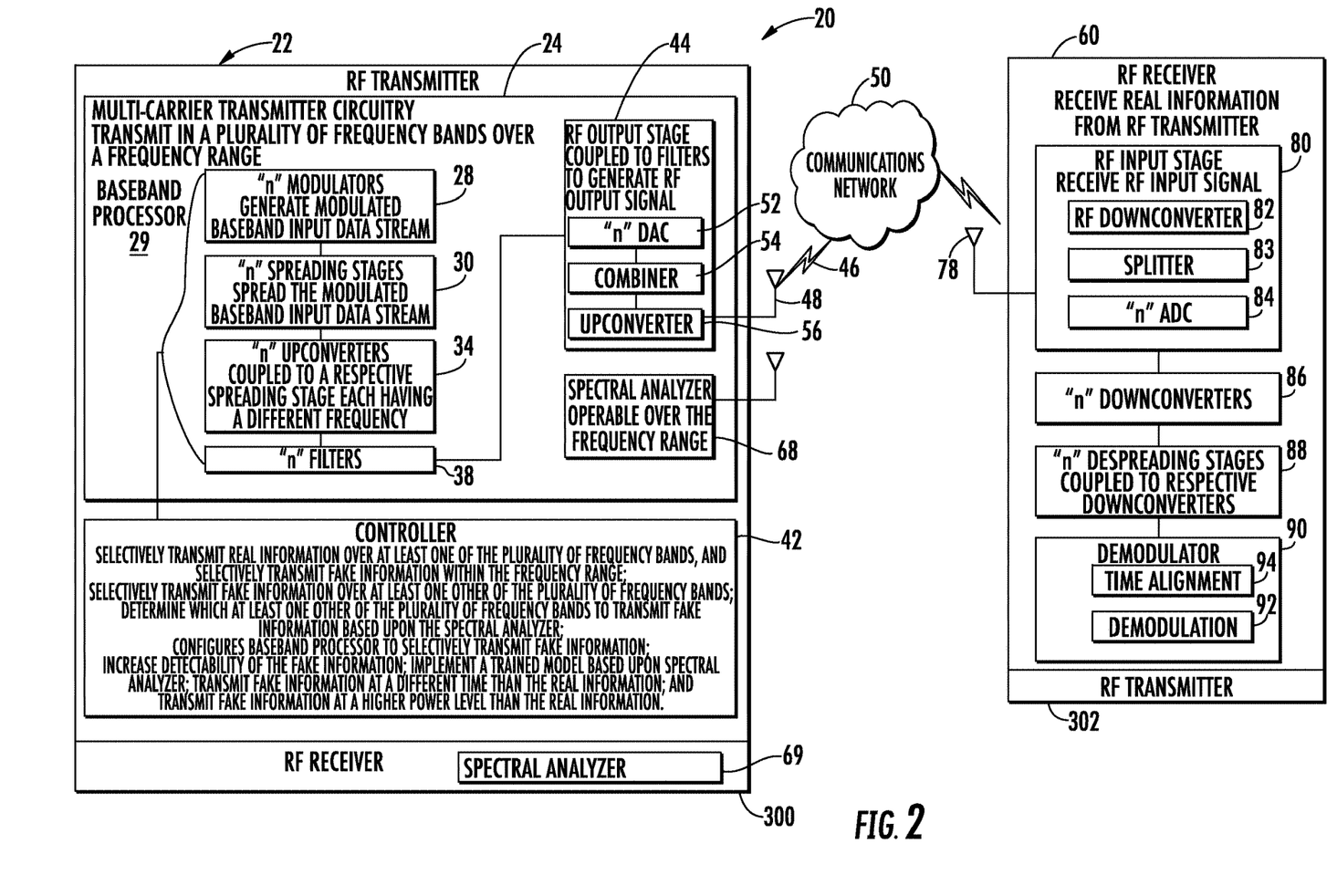
FIG. 2 is a more detailed block diagram of the system of FIG. 1.

Referring initially to FIGS. 1 and 2, an RF communications system is illustrated generally at 20 and includes an RF transmitter 22 having multicarrier transmitter circuitry 24 that is configured to transmit in a plurality of frequency bands over a frequency range. The multicarrier transmitter circuitry 24 includes a plurality of modulators shown as "n" modulators at 28, which are configured to generate a modulated baseband input data stream from data that is generated from an input data source that may be integrated with the RF transmitter 22 or separately generated from another location remote from the RF transmitter. The "n" modulators 28 and other components to be described may be part of a baseband processor as indicated at 29. The input data as a data stream may include real information and fake information, and a modulator 28 may modulate the real and fake information, and another modulator may modulate only fake information or variations of that modulation as explained in greater detail below. A plurality of spreading stages are coupled downstream from the plurality of modulators and shown as "n" spreading stages at 30 and are configured to spread the modulated baseband input data stream based upon respective coefficient sequences. It should be understood that the spreading stages 30 may be operative using a common spreading sequence or a different spreading sequence or a combination of both. In an example, the real information may be spread with the plurality of spreading stages 30 and the fake information may not be spread.

In this example, a plurality of upconverters shown as "n" upconverters at 34 are connected in this example to the plurality of spreading stages 30. Each upconverter 34 is coupled to a respective spreading stage 30 and each upconverter may have a different frequency. These different operating frequencies of the plurality of upconverters 34 may be configured to generate a plurality of carriers as separate frequency bands over a frequency range. A plurality of filters are coupled downstream to the plurality of spreading stages and shown as "n" filters at 38, and in an example, are each connected to a respective upconverter 34. The filters 38 filter the signal received from the upconverters and reduce side lobes, but may also operate, in this example, as cyclostationary filters as will be explained in greater detail below, and operate via a controller illustrated at 42 to configure the baseband processor 29 to selectively transmit fake information and allow fake information to be carried on a specific frequency band or sub-carrier as a channel easier to locate by an adversary or rogue individual, and allow the real information carried on specific channels or sub-carriers as frequency bands more difficult to locate. An RF output stage 44 is coupled to the filters 38 to generate a RF output signal 46 that is transmitted via an antenna 48 from the RF transmitter 22 to a communications network illustrated at 50, and in this example, a wireless communications network. Other communications networks may be used.

The RF output stage 44 may include a plurality of DACs 52 coupled to the plurality of upconverters 34 and filters 38, and a signal combiner 54 combines signals received from the plurality of DACs 52. An RF upconverter 56 may be coupled to the combiner 54 and upconverts the multicarrier Intermediate Frequency (IF) signal received from the combiner into the RF output signal 46. The RF output signal 46 is transmitted via the antenna 48, in this example, over-the-air and through the communications network 50 to a RF receiver 60 configured to receive the real information from the RF transmitter 22.

The controller 42 may be formed as a Digital Signal Processor and/or Field Programmable Gate Array (FPGA) circuitry and operate with and control one or more data generators to produce input data having both real information and fake information, which is modulated via the modulators 28. The controller 42 is operatively connected to the multicarrier transmitter circuitry 24 as part of baseband processor 29, such as the modulators 28, filters 38, spreading stages 30 and upconverters 34, and other multicarrier transmitter circuitry components. The controller 42 may be configured to selectively transmit real information over at least one of the plurality of frequency bands, including the frequency of interest, and to selectively transmit fake information within the frequency range, e.g., over at least one other of the plurality of frequency bands, or to increase detectability of the fake information, or to transmit at a different time than the real information, or transmit at a higher power than the real information, or in any combination.

In an example, the controller 42 configures the multicarrier transmitter circuitry 24 to selectively transmit the fake information, for example, as a signal carrying the fake information at greater power with narrower or wider bandwidth in the middle of the multicarrier signals that are carried on a number of frequency bands forming in this example by the spreading stages 30 on an actual spread signal. Any jammer or tracker, i.e., an adversary or rogue individual, may track the stronger, fake signal, which may be produced by the multicarrier transmitter circuitry 24, which may include circuitry especially configured to produce any stronger, fake signal. In an example, one frequency band could be selected to carry the narrowband signal rather than creating another frequency band as a channel having the same bandwidth as all the other channels. A signal carrying fake information could have a varying frequency offset away from the desired communication signals carrying the real information. The controller 42 may work with the multicarrier transmitter circuitry 24 to selectively transmit the fake information over one or more of the frequency bands of the multicarrier signal.

In an example, the multicarrier transmitter circuitry 24 may include a spectral analyzer 68 that is operable over the frequency range. The spectral analyzer 68 may operate to analyze the spectrum of frequency bands used by the RF transmitter 22 and other signals using techniques known to those skilled in the art. The controller 42 may be configured to operate with the spectral analyzer 68 and determine which at least one other of the different frequency bands may be used to transmit the fake information based upon the spectral analyzer. The controller 42 may operate the baseband processor 29 and associated multicarrier transmitter circuitry 24 to increase the detectability of fake information, for example, by transmitting any fake information over a carrier or frequency band at a higher power and signal-to-noise ratio (SNR) in a manner that is correlated with a desired modulation.

The controller 42 may operate the multicarrier transmitter circuitry 24 to transmit the fake information at a different time than the real information, or transmit the fake information at a higher power level than the real information. This may be accomplished by controlling certain filters 38 that may operate as cyclostationary filters, in an example, or by controlling various amplifiers (not illustrated), the spreading stages 30, upconverters 34, or other components of the multicarrier transmitter circuitry 24.

It is possible to use multiple, remote "false-flagging" transmitter nodes to draw attention away from the actual communications of real information, such as by another RF transmitter, and draw attention away from the actual RF transmitter signals that transmit the real information. As will be explained in greater detail below with reference to the description of FIG. 7, the controller 42 may cooperate with the multicarrier transmitter circuitry 24 and spectral analyzer 68 to implement a trained model as a machine learning model, for example, based upon the spectral analyzer.

Figure 3:
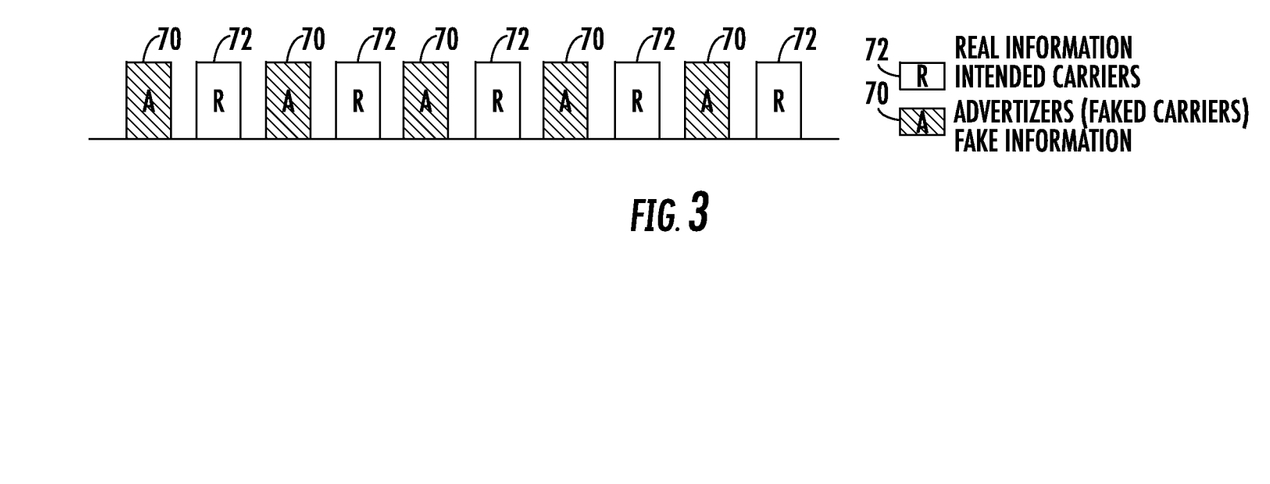
FIG. 3 is a schematic diagram showing real information and fake information transmitted over frequency bands of the RF communications system of FIG. 1.

Referring now to FIG. 3, there is shown a schematic diagram of examples of real information and fake information that are transmitted over different frequency bands. The fake information is shown generally at 70 as fake carriers and are also termed "advertisers" since they are carrier signals with purposefully more pronounced detectable characteristics such as cyclostationary features, and are mixed with the real information carried on the frequency bands designated at 72. In this drawing, the fake information 70 as fake carriers or advertisers are labeled by the "A" and the intended carriers with real information 72 are labeled by "R," indicative of real information. In this example of FIG. 3, each carrier 70 having fake information "A" is interspersed with carriers having the real information "R" as the intended carriers 72. Frequency spacing between the carriers may be of equal intervals or random that adds another degree of deception.

Figure 4:
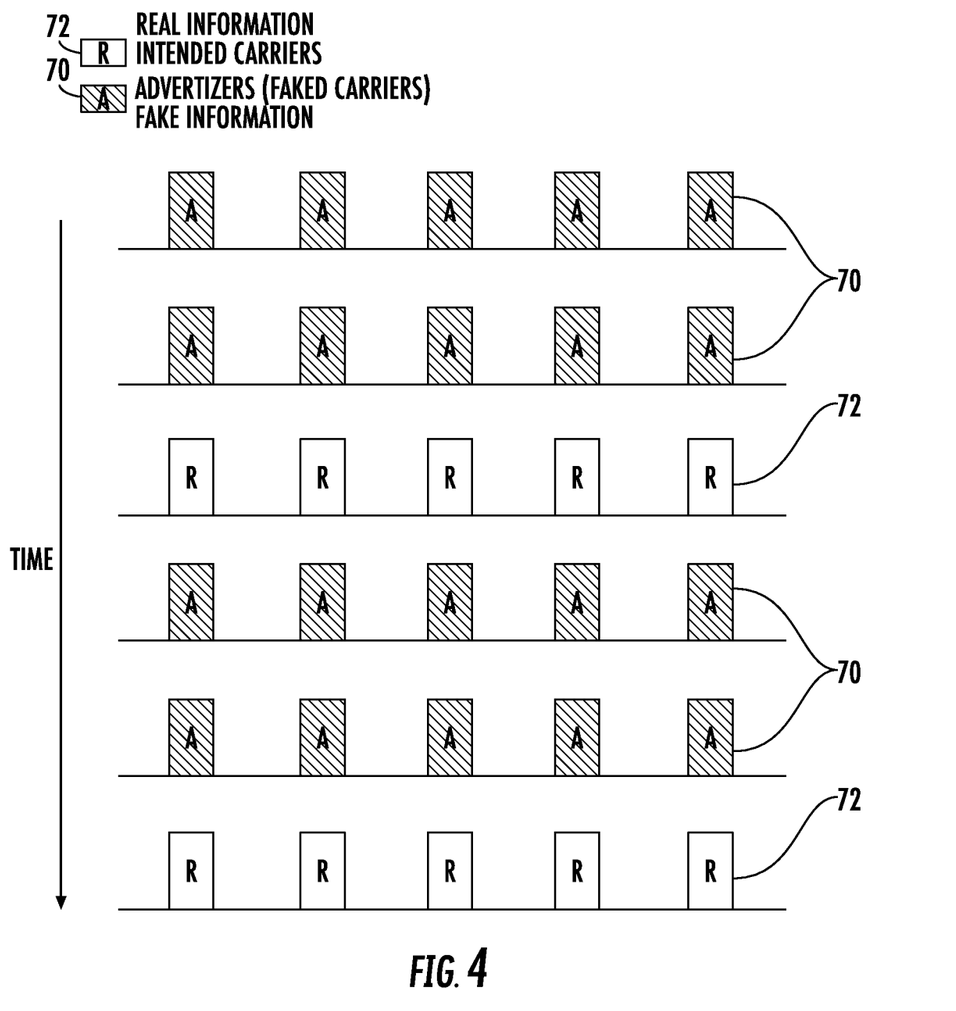
FIG. 4 is another schematic diagram showing the real information as transmitted and fake information interspersed at certain intervals over time.
Figure 5:
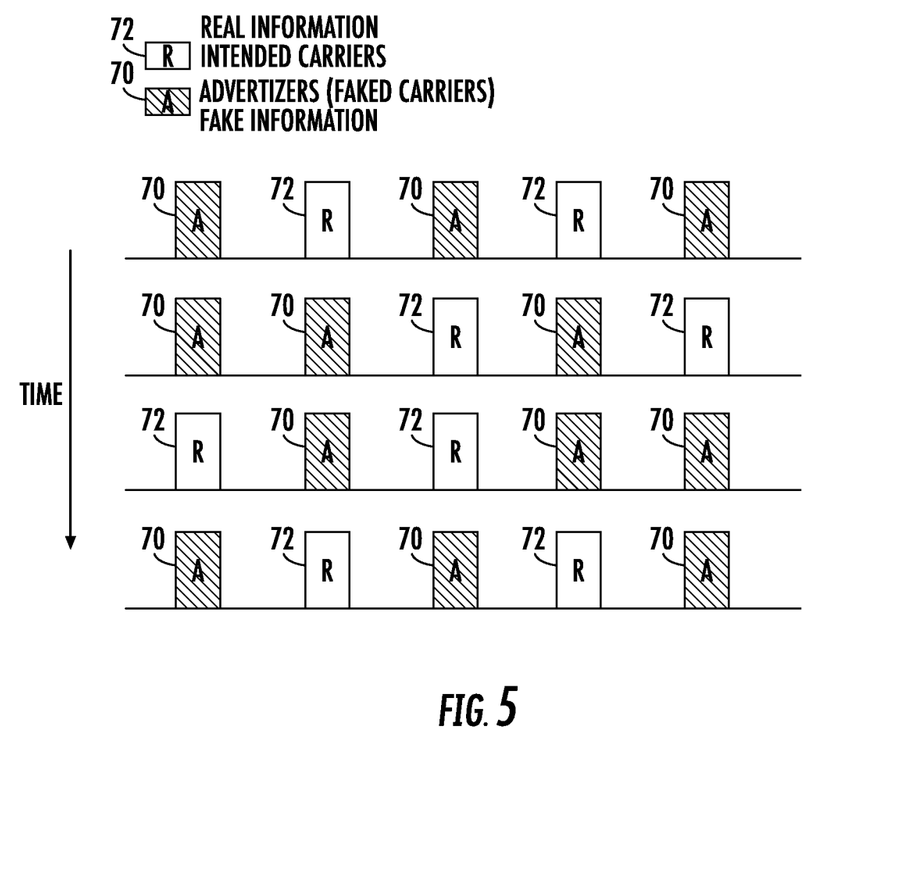
FIG. 5 is another schematic diagram showing real information and fake information transmitted over frequency bands with the real information carried on changing frequency bands.

Referring now to FIG. 4, in this example, the intended carriers 72 having the real information is interspersed over time with carriers 70 having the fake information as the advertisers "A." As shown in FIG. 5, on the other hand, the carrier position for the intended carriers 72 having the real information "R" are changed in carrier position over time as compared to the carriers 70 having the fake information, i.e., as advertisers "A." Again, the "advertisers" are signals with pronounced detectability.

As noted before and referring again to FIG. 2, the RF output signal 46 is transmitted via the antenna 48 over-the-air, and in this example, through the communications network 50 to the RF receiver 60, which receives the RF signals within a receiver antenna 78 and into an RF input stage 80 configured to receive the RF input signal via the antenna. The RF input stage 80 includes receiver circuitry, e.g., an RF downconverter 82, signal splitter 83 and a plurality of analog-to-digital converters (ADC) 84 coupled to the splitter that converts each carrier of the downconverted RF input signal into a digital format for further signal processing. The digital signal may be digitally downconverted in a plurality of downconverters illustrated generally by "n" downconverters at 86 and despread in a plurality of despreading stages, shown generally by "n" despreading stages at 88, with each despreading stage 88 coupled to a respective downconverter 86. A demodulator 90 is coupled to the despreading stages and configured to perform a demodulation 92, and in an example, time alignment 94 upstream of the demodulation. The demodulator 90 may be formed as a demodulation processor and be incorporated within a Field Programmable Gate Array (FPGA) or Digital Signal Processor (DSP) or both, which includes circuit functions for despreading and down conversion.

The real information can be separated from fake information at the RF receiver 60 using various filters at the RF input stage 80 and in association with downconverters 86 and despreading stages 88 and the demodulator 90 or ignored by the receiver processor. The time alignment 94 may be used when data is carried on multiple carriers and carriers may have to be correlated to boost signal-to-noise (SNR) ratio, and obtain better signal strength via correlation of the signals. The time alignment circuit 94 may be formed as part of a demodulation processor with sufficient memory storage for correlation.

Figure 6:
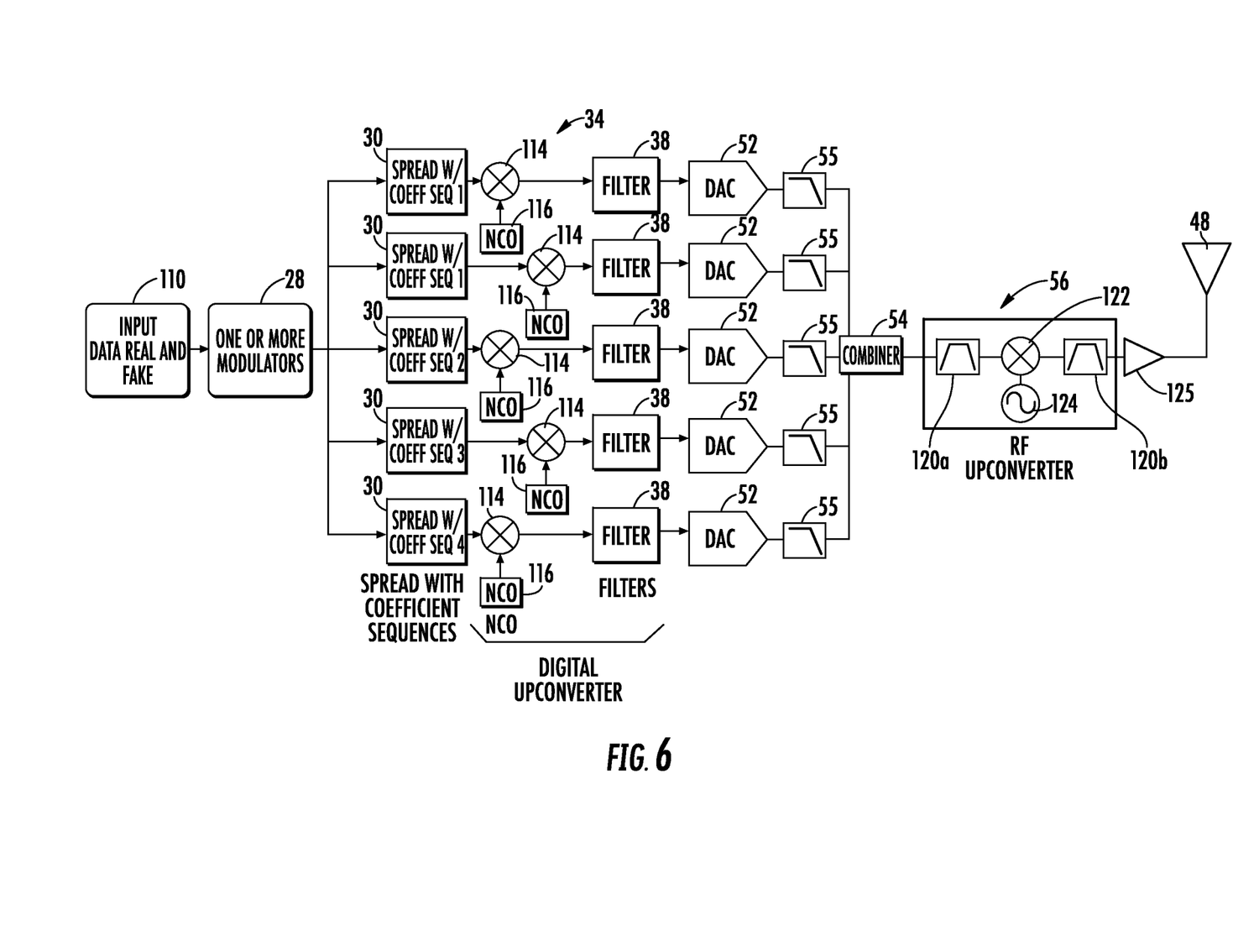
FIG. 6 is a schematic block diagram showing major components in the RF transmitter of FIG. 1.

Referring now to FIG. 6, there are shown greater details of the RF transmitter 22 operating in this non-limiting example with five carriers as frequency bands and showing five spreading stages 30 that are configured to spread a modulated baseband input data stream received originally from a data source as input data 110, which may include data that is real information and data that is fake information, both which may be modulated and spread. The input data 110 may be modulated in one or more modulators 28. Some of the data may be copied so the same data is spread within two or more spreading stages 30. It should be understood that the carriers used in the system do not have to be spread depending on the system demands and requirements.

In this example, each of the spreading stages 30 may receive a specific spreading coefficient sequence, with two of the spreading coefficient sequences the same for two spreading stages 30. Two frequency bands as channels may have the same or different data and the same spreading sequence is indicated by spreading coefficient sequence 1, as compared to the other three remaining spreading stages 30, where the remaining three channels have different spreading coefficient sequences, indicated as spreading coefficient sequences 2, 3, and 4, and received within those respective spreading stages.

One of the modulators 28 may be operative with the controller 42 to transmit and spread fake information within the frequency range. In another example, a modulator 28 specific for fake information may modulate fake information and may be operable within the frequency range of interest and transmit the fake information over a stronger carrier in the middle of the frequency range. That narrowband and stronger signal could pass directly to the combiner 54 and be transmitted with the frequency bands carrying the real information and possibly frequency bands carrying fake information. The signals, once digitally spread, may be received within the plurality of upconverters 34, where each upconverter is connected to a respective spreading stage 30. Each upconverter 34 may include a mixer 114 that receives a synthesized local oscillator signal from a numerically controlled oscillator (NCO) 116 to convert each respective spread signal from a spreading stage 30 digitally into an intermediate frequency. Each NCO 116 digitally generates its local oscillator signal such that the plurality of carriers as frequency bands are generated and spaced to each other, and may possibly include a guard band and form multiple carriers as frequency bands over a frequency range. The number of frequency bands can vary, for example, 5, 10, 15, 20, or more frequency bands.

Each carrier signal of the multicarrier signal may be filtered within the baseband processor 29 using a filter 38 to reduce side lobes. The filters 38 may be used to remove cyclostationary features of frequency bands carrying real information. The filtering may be bypassed for carriers containing fake information, and thus, make the carriers or frequency bands carrying the fake information within the frequency range easier to find. After filtering, the signals are sampled out via the plurality of DACs 52 and bundled by combiner 54 to form a single multicarrier signal at an intermediate frequency in this example.

In an example, the real information may be spread within the plurality of spreading stages 30 and the fake information may not be spread. The spreading stages 30 may also operate using a common spreading sequence, i.e., the same spreading coefficient sequence for all five spreading stages 30 resulting in a less complex and more simple implementation, where each of the five different spreading stages may operate using a different spreading coefficients sequence, i.e., all five are different, resulting in more complex operation and greater difficulty to intercept and decode. The use of identical or different coefficient sequences for the same or different spreading sequences 30 may be applied interchangeably for each sub-band or carrier 72 and increase the difficulty to intercept for a low probability of detection. Each signal from a respective spreading stage 30 is separately upconverted to an IF frequency, in this example, in the mixers 114 and filtered by the respective filters 38. From each DAC 52, the signal passes through a low pass filter 55 and then combined in the combiner 54.

The output of the combiner 54 may be upconverted again to a higher radio frequency (RF) output signal in the upconverter 56 that includes first and second bandpass filters 120*a*, 120*b*, RF mixer 122, and local oscillator (LO) 124, and a power amplifier 125 as illustrated. The spacing between channels or carriers may remain the same, but the RF output signal may be upconverted at this point.

The number of channels may vary, of course, up to 10, 15, or 20 or more channels, depending on design. The peak-to-average power ratio (PAPR) of the aggregate signal may increase as the number of channels increases. A higher PAPR may limit the overall communications system performance both in transmitted power and RF transmitter 22 and RF receiver 60 efficiency. The signal may be treated with a PAPR reduction technique, such as via a crest factor reduction filter having a phase offset to minimize system performance degradation. The timing and phase alignment between carriers may be maintained closely through the transmit and receive process for maximum system performance.

Figure 7:
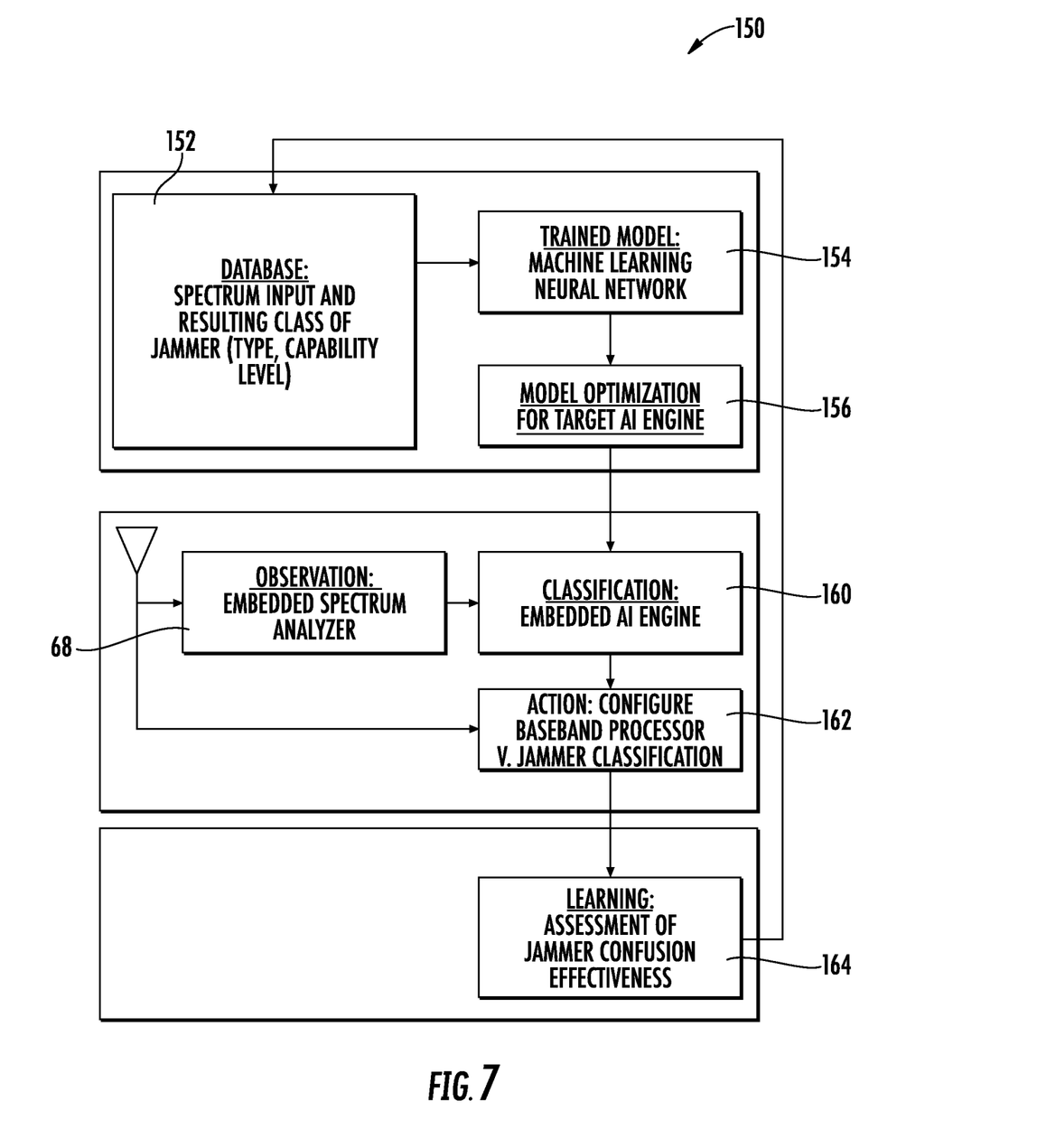
FIG. 7 is a block diagram of a machine learning model that may be used with the RF communications system of FIG. 1.

Referring now to FIG. 7, there is illustrated a machine learning model indicated generally at 150. The controller 42 may be configured to cooperate with the transmitter circuitry 24, which includes the spectral analyzer 68 operable over the frequency range to implement the trained model based on the spectral analyzer. As noted before, fake information may be inserted in a detectable/jammable frequency band among the "real" information, such as in other frequency bands. The effectiveness of the RF communications system 20 may be monitored by learning and adapting in the frequency, space, and time dimensions any fake information to mitigate any jamming, using techniques known to a jammer, so the jammer or other rogue individual is spoofed into thinking they are jamming a real signal having real information.

For example, the machine learning model 150 may be trained to take in known or future jammer types for training. During operation, the learning model may be incorporated within the controller 42 as part of the RF transmitter 24, e.g., a mobile wireless communications device, which contains the RF transmitter 22 as an edge device and uses the determined spectral frequency and signal classification in jammer mitigation techniques. It is possible to choose and generate the best waveform modulation format to allow a jammer or rogue individual to "succeed," while also transmitting the desired information in a manner that the jammer or rogue individual is not observing or concerned about since the jammer or rogue individual is distracted by the primary "target" as the fake information in the frequency channel as the jammer. Results may be fed back into an updated/retrained model.

As shown in FIG. 7, the machine learning model 150 includes use of a database 152 that may store data regarding the spectrum input and the resulting classes of jammer, such as the jammer type and its capability level. The trained model includes a machine learning neural network 154, where processing occurs to optimize a model for a targeted artificial intelligence (AI) engine 156. The database 152, trained model as the machine learning neural network 154 and model optimization 156 for the AI engine may be used for designing, training, and building a training database from known jammer behavior, and may be upgraded and replaced by self-generated training data within a specific device, such as a mobile wireless communications device. It is possible to train the machine learning model 150 based on that data and the model may classify incoming radio spectrum in terms of jammer "signatures" that indicate type and capability level. The machine learning model may be embedded in a radio hardware and controller 42 to deploy any artificial intelligence and map the AI engine.

The embedded spectral analyzer 68 observes the frequency spectrum and together with the embedded artificial intelligence engine will classify data 160, and with the controller 42 configure the baseband processor 29 and different frequency channels versus jammer classification 162. The spectral analyzer 68 will observe spectrum conditions in real-time and the machine learning model 150 may classify radio spectrum conditions into one of several jamming classes. The machine learning model 150 may provide a most likely classification for different jamming classes, for example, a second highest percentage result for one compared to a highest percentage. Different techniques may be used for producing the real information and fake information over specific frequency bands and the model may be trained as a function of jammer classification. The effectiveness of jammers may be assessed 164, and different choices tried, and a metric of the ability to communicate, such as the best signal-to-noise ratio for Quality of Experience (QoE) or metric of jammer reaction may be applied, and as a result, the controller 42 may change techniques of jamming.

An assessment of jammer confusion effectiveness may be learned by observing and grading the effectiveness of the fake information versus the real information and feed new data into the training database 152, and periodically retrain the model, and redeploy it with updates and improvements. The machine learning model 150 may incorporate various routines and create various objects and import data, such as signal strength received from the embedded spectral analyzer 68 as minimum, maximum, and average signal strengths relative to an on-channel center frequency for each of the frequency bands, and import data regarding output classifications, such as whether the spectrum is good versus any co-site versus jammer data. Different frequency bins with amplitude measurements may be made and used in the model.

Figure 8:
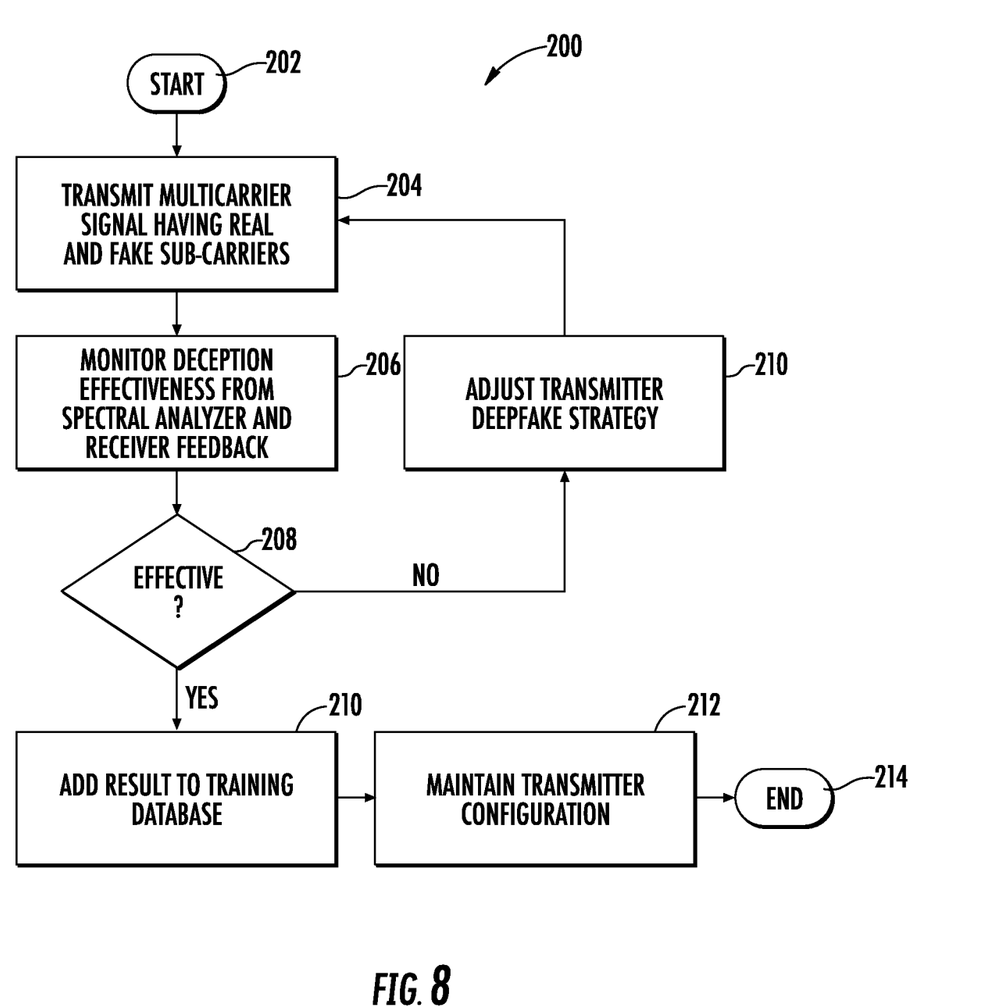
FIG. 8 is a high level flowchart of a method for operating the RF transmitter of FIG. 1.

Referring now to FIG. 8, there is illustrated a high level flowchart of a method of operating the RF transmitter illustrated generally at 200. The process starts (Block 202).

The process continues by transmitting the multicarrier signal having real and fake sub-carriers (Block 204). The deception effectiveness is monitored from the spectral analyzer and based upon receiver feedback (Block 206). A determination is made whether the deception effectiveness is effective (Block 208) and if not, as shown by the indication for "NO," then the transmitter deep fake strategy is adjusted (Block 210) and transmission continued (Block 204). This could include any number of adjustments and strategies as discussed above. If it is effective, i.e., "YES," then the result is added to the training database (Block 210) and the transmitter configuration maintained (Block 212). The process ends (Block 214).

The RF communication system 20 may use the machine learning with multiple existing and future anti-jamming techniques to allow new spoofing techniques. An adversary or rogue individual may believe they are successfully jamming the communications, when in fact, they are not.

The RF transmitter 22 and RF receiver 60 may be co-located to form a single transceiver, such as a mobile wireless communications device with a RF receiver 300 part of the RF transmitter 22 and a RF transmitter 302 part of the RF receiver 60 as shown in FIG. 2. A common system synthesizer circuit may operate with various downconverters and upconverters and include RF transmitter 22 and RF receiver 60 mixers and appropriate filters, amplifiers and variable resistors for better gain control signal processing. The RF receiver 60 may include a low noise amplifier (LNA) and the RF transmitter 22 may include a power amplifier 125. Other components may be selected depending on the design chosen by one skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) communications system comprising:
   an RF transmitter comprising
      multicarrier transmitter circuitry configured to transmit in a plurality of frequency bands over a frequency range and with selectable spreading, the multicarrier transmitter circuitry comprising
         a plurality of modulators,
         a plurality of spreading stages coupled downstream from the plurality of modulators, and
         a plurality of filters coupled downstream from the plurality of spreading stages, and
      a controller configured to selectively transmit real information over at least one of the plurality of frequency bands with spreading, and to selectively transmit fake information within the frequency range without spreading; and
   an RF receiver configured to receive the real information from the RF transmitter.

2. The RF communications system of claim 1 wherein the controller is configured to selectively transmit the fake information over at least one other of the plurality of frequency bands.

3. The RF communications system of claim 2 further comprising a spectral analyzer operable over the frequency range; and wherein the controller is configured to determine which at least one other of the plurality of frequency bands to transmit the fake information based upon the spectral analyzer.

4. The RF communications system of claim 1 wherein the controller is configured to operate the multicarrier transmitter circuitry to increase detectability of the fake information.

5. The RF communications system of claim 1 further comprising a spectral analyzer operable over the frequency range; and wherein the controller is configured to cooperate with the multicarrier transmitter circuitry to implement a trained model based upon the spectral analyzer.

6. The RF communications system of claim 1 wherein the controller is configured to transmit the fake information at a different time than the real information.

7. The RF communications system of claim 1 wherein the controller is configured to transmit the fake information at a higher power level than the real information.

8. A radio frequency (RF) transmitter comprising:
   multicarrier transmitter circuitry configured to transmit in a plurality of frequency bands over a frequency range and with selectable spreading, the multicarrier transmitter circuitry comprising
      a plurality of modulators,
      a plurality of spreading stages coupled downstream from the plurality of modulators, and
      a plurality of filters coupled downstream from the plurality of spreading stages; and
   a controller configured to selectively transmit real information over at least one of the plurality of frequency bands with spreading, and to selectively transmit fake information within the frequency range without spreading.

9. The RF transmitter of claim 8 wherein the controller is configured to selectively transmit the fake information over at least one other of the plurality of frequency bands.

10. The RF transmitter of claim 9 comprising a spectral analyzer operable over the frequency range; and wherein the controller is configured to determine which at least one other of the plurality of frequency bands to transmit the fake information based upon the spectral analyzer.

11. The RF transmitter of claim 8 wherein the controller is configured to operate the multicarrier transmitter circuitry to increase detectability of the fake information.

12. The RF transmitter of claim 8 comprising a spectral analyzer operable over the frequency range; and wherein the controller is configured to cooperate with the multicarrier transmitter circuitry to implement a trained model based upon the spectral analyzer.

13. The RF transmitter of claim 8 wherein the controller is configured to transmit the fake information at a different time than the real information.

14. The RF transmitter of claim 8 wherein the controller is configured to transmit the fake information at a higher power level than the real information.

15. A method of operating a radio frequency (RF) transmitter comprising:
   transmitting from multicarrier transmitter circuitry in a plurality of frequency bands over a frequency range and with selectable spreading, the multicarrier transmitter circuitry comprising
      a plurality of modulators,
      a plurality of spreading stages coupled downstream from the plurality of modulators, and
      a plurality of filters coupled downstream from the plurality of spreading stages; and
   operating a controller to selectively transmit real information over at least one of the plurality of frequency bands with spreading, and to selectively transmit fake information within the frequency range without spreading.

16. The method of claim 15 comprising operating the controller to selectively transmit the fake information over at least one other of the plurality of frequency bands.

17. The method of claim 16 comprising operating the controller to determine which at least one other of the plurality of frequency bands to transmit the fake information based upon a spectral analyzer operable over the frequency range.

18. The method of claim 15 comprising operating the controller to operate the multicarrier transmitter circuitry to increase detectability of the fake information.

19. The method of claim 15 comprising operating the controller to cooperate with the multicarrier transmitter circuitry to implement a trained model based upon a spectral analyzer operable over the frequency range.

20. The method of claim 15 comprising operating the controller to transmit the fake information at a different time than the real information.

21. The method of claim 15 comprising operating the controller to transmit the fake information at a higher power level than the real information.

* * * * *